Sept. 23, 1930.  J. O'BRIEN  1,776,739
HONEY SECTION CLEANER
Filed June 10, 1925    4 Sheets-Sheet 1
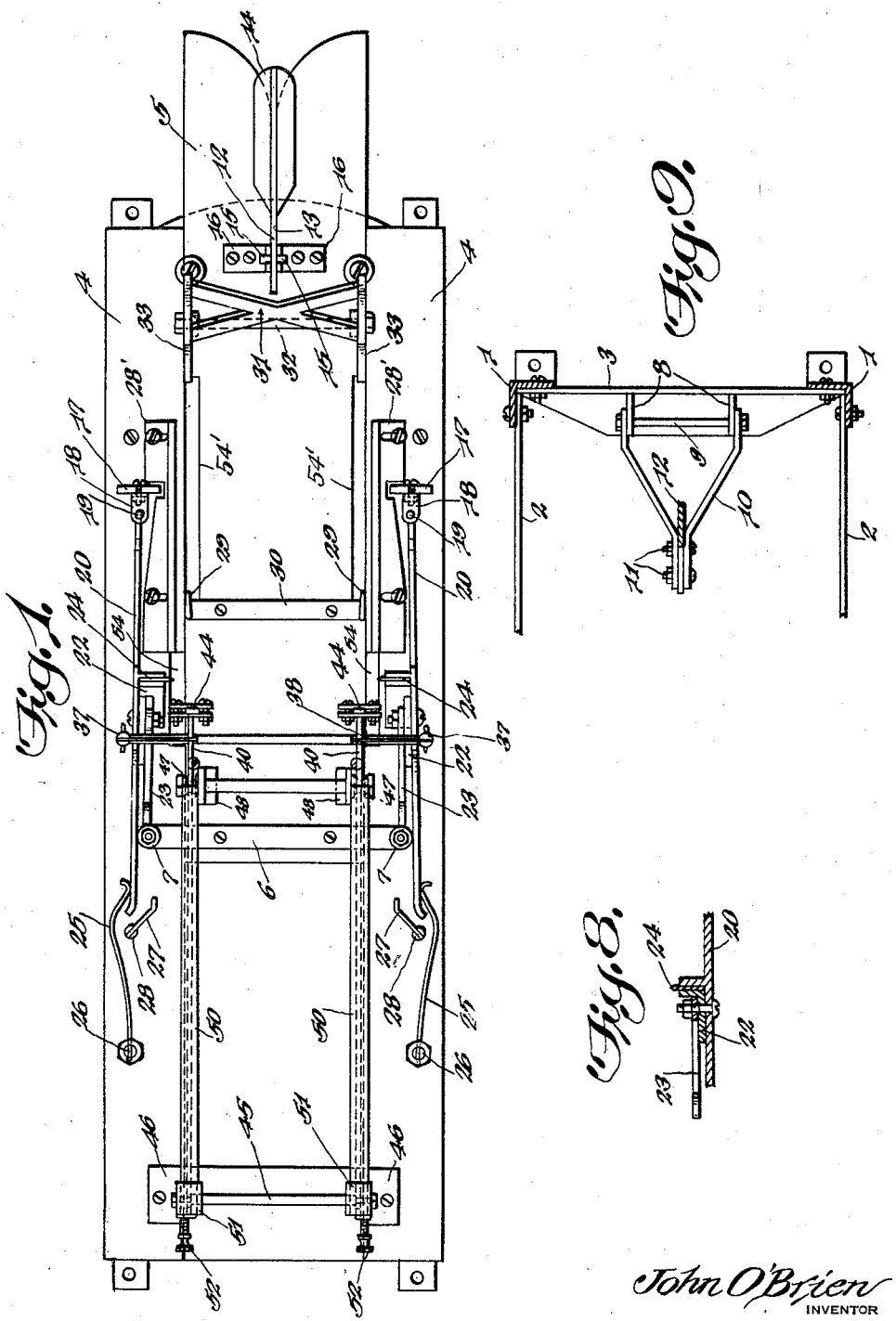

Sept. 23, 1930. J. O'BRIEN 1,776,739
HONEY SECTION CLEANER
Filed June 10, 1925 4 Sheets-Sheet 2
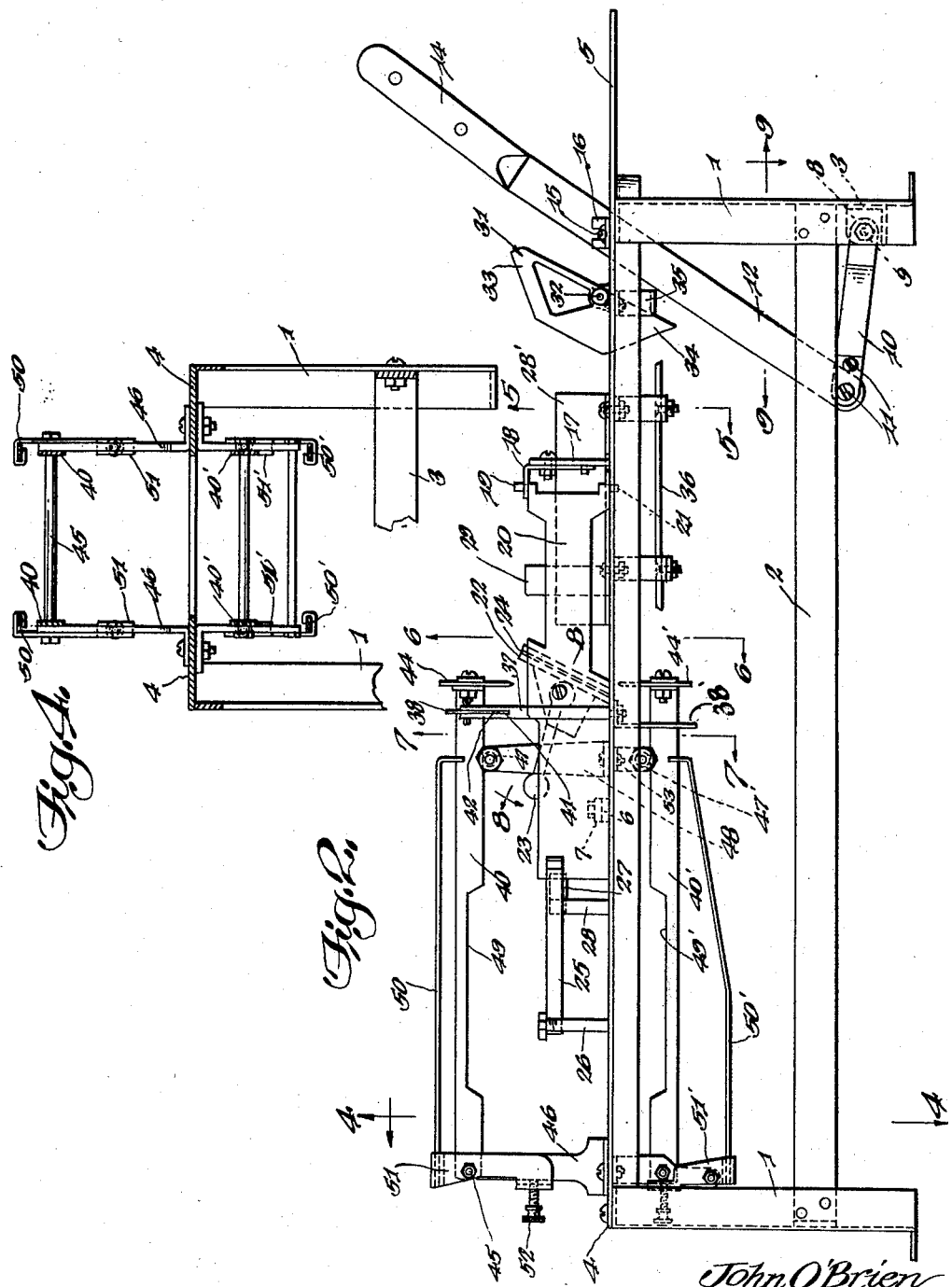
John O'Brien INVENTOR
BY Victor J. Evans ATTORNEY Sept. 23, 1930. J. O'BRIEN 1,776,739
HONEY SECTION CLEANER
Filed June 10, 1925 4 Sheets-Sheet 3
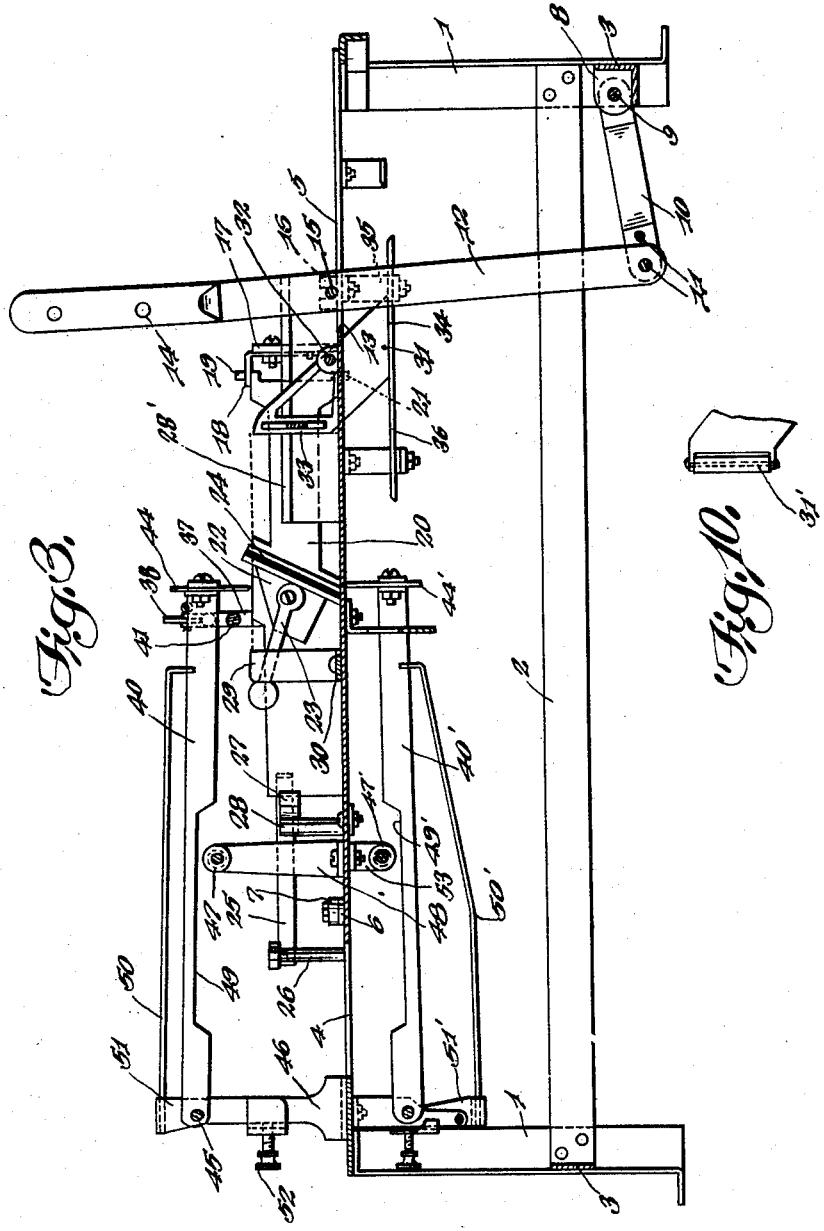
John O'Brien
INVENTOR
BY Victor J. Evans
ATTORNEY Sept. 23, 1930.  J. O'BRIEN  1,776,739
HONEY SECTION CLEANER
Filed June 10, 1925   4 Sheets-Sheet 4
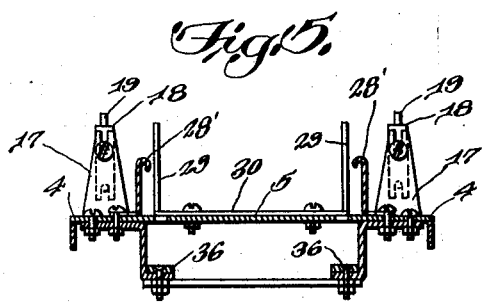
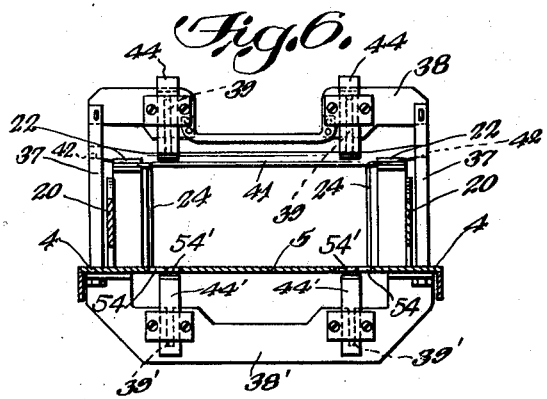
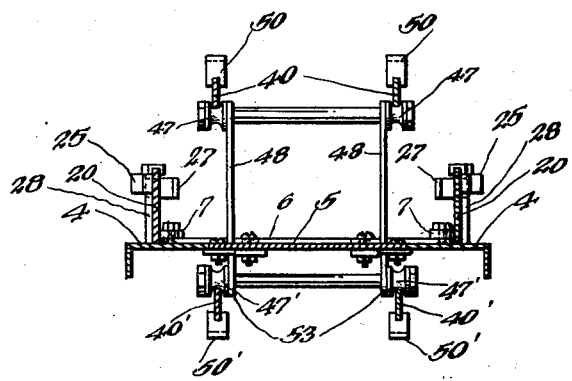
John O'Brien
INVENTOR
BY Victor J. Evans
ATTORNEY Patented Sept. 23, 1930

1,776,739

UNITED STATES PATENT OFFICE

JOHN O'BRIEN, OF NEWARK, ILLINOIS

HONEY-SECTION CLEANER

Application filed June 10, 1925. Serial No. 36,287.

This invention relates to new and useful improvements in scraping machines and more particularly to a device which is used for scraping bee glue and other similar residue from the sections used for containing comb honey. The main object of my invention is the provision of a machine of the above character wherein the sections containing comb honey are securely clamped in position and moved relative to properly positioned scraping blades whereby the sides of the sections, as well as the top and bottom edges will be brought into contact with the scraping blades for removing bee glue and other material which generally accumulates on the sections while the sections are being filled with honey.

It is a well known fact that when the sections containing comb honey are removed from the supers of the bee hives they usually have a good deal of bee glue and similar material stuck to the sides and edges and it is very beneficial to the market value of the honey containing sections that this be removed from the exterior of the sections and it is one of the principal objects of my invention to provide means whereby this material can be readily removed from the sections and in a very short space of time so that the sections when placed upon the market will present a neat, clean appearance.

Another object of my invention is the provision of a scraping machine including a movable platform with means carried by the platform for automatically clamping the sections against movement and through movement of the platform automatically move scraping knives into contact with the sides and top and bottom edges of the sections for thoroughly scraping the material from the sections and said scraping blades being automatically removed from engagement with the sections when the platform is moved in one direction.

With the above and other objects in view, my invention consists in the novel features of construction and the combination and arranged parts to be hereinafter more fully described, pointed out in the claims and shown in the accompanying drawings, in which Fig. 1 is a top plan view of a scraping machine constructed in accordance with my invention.

Fig. 2 is a side elevation illustrating the machine in position ready to receive the section of comb honey.

Fig. 3 is a vertical sectional view showing the scraping machine in contact with a section.

Fig. 4 is a detailed section on the line 4—4 of Fig. 2.

Fig. 5 is a detailed section on the line 5—5 of Fig. 2.

Fig. 6 is a detailed section on the line 6—6 of Fig. 2.

Fig. 7 is a detailed section on the line 7—7 of Fig. 2.

Fig. 8 is a detailed section on the line 8—8 of Fig. 2.

Fig. 9 is a detailed section on the line 9—9 of Fig. 2.

Fig. 10 is a detailed perspective view illustrating a slight modification.

My improved machine is mounted upon a frame which comprises the angular standards 1, side bars 2 and end bars 3. Extended beyond the longitudinal sides of the frame at the top thereof are the side plates 4 and slidably mounted between the plates 4 is the platform 5, the inner end of which is supported by means of a transverse bar 6 the intermediate portion of which is connected to the platform 5 while the ends thereof are slidably mounted upon the side plates 4 and arranged upon which are the rollers 7.

One of the cross pieces 3 at one end of the frame is provided with inwardly extending perforated ears 8 supporting a bearing rod 9, the ends of which project beyond the ears 8 and mounted upon the ends of the rod are the inner ends of a yoke 10. The outer ends of the yoke 10 are brought into close relation and connected by means of the bolts 11 one of which serves as a pivot bolt for the lever 12. The lever 12 is disposed in a slot 13 formed in one end of the platform 5 and has a handle 14 at its upper end for manually manipulating said lever.

The lever 12 is provided with oppositely disposed bearing pins 15 adjacent its upper end which are loosely mounted within the U shaped bearings 16 carried by the platform 5 whereby reciprocating movement of the lever 12 will move the platform 5 longitudinally of the frame, the lever being pivotally connected to the yoke 10 for swinging movement.

Extending upwardly from the side thereof upon opposite sides of the movable platform are the standards 17 and adjustably mounted on these standards are the angle plates 18, the horizontal portions of which are provided with openings to receive the studs 19 carried by the upper edge of the plates 20. The lower edges of the plates 20 are provided with studs 21 which fit into suitable openings in the plates 4 whereby to mount the plates 20 for swinging movement.

The plates 20 have attached to the inner faces thereof brackets 22 which are disposed at an oblique angle relative to the horizontal position of the plates and carry cam levers 23 which are used for clamping the scraping blades 24 in position within the brackets. The ends of the plates 20 opposite the pivot point thereof are normally urged inwardly toward the inner center of the frame by means of springs 25 which are attached to the posts 26 carried by the side plates 4 and bear against the outer faces of the plates 20 as is clearly illustrated in Figure 1. When the platform 5 is positioned at one end of the frame as shown at Figure 1, the rollers 7 carried by the cross bar 6 are normally engaged with the inner ends of the plates 20 to retain them in a spreading position but when the platform 5 is moved longitudinally toward the other end of the frame the rollers 7 pass from the ends of the plates 20 and the springs 25 will cause the plates to move inwardly bringing the cutting blades 24 into contact with the sides of the section mounted upon the platform. The inward movement of the plates 20 is limited by means of the stop arms 27 which are carried by the posts 28.

In Figure 1 the platform 5 is shown in position ready to receive the section thereon. The sections are placed upon the platform between the upstanding guide members 28' as shown with one end fitted closely up against the upstanding arms 29 of the U shaped member 30 which is carried by the platform. The section is clamped against the arms 29 by means of a movable frame 31 which is pivotally mounted at 32 upon the platform 5 and carries the engaging members 33 which are adapted to cooperate with the arms 29 for clamping the section in position upon the platform.

The frame 31 is tapering at 34 extended below the platform and adapted to engage the stops 35 for swinging the platform to an inoperative position as shown in Fig. 2. As the platform 5 moves forwardly to the position shown in Fig. 3, the tapering portions 34 of the frames 31 will engage with the horizontally positioned track-ways 36 and ride thereon as shown in Fig. 3. This movement securely clamps the section in position for moving the same past the scraping knives but it will be noted that upon reverse movement, the tapering portions 34 of the frames 31 will ride off the track-ways and through engagement with the stops 35 move the platform away from the sections.

Mounted upon the side plates 4, are the standards 37, shown in Fig. 6, which support the upper guide members 38. The movable bars 40, passing through slots 39, are spaced above a cross rod 41, mounted in the standards at 42. The vertically disposed scraper plates 44, adjustably mounted on the movable bars 40 are adapted to engage the upper edges of the section carried by the platform 5. Bars 40, are pivotally mounted on the standards 46, at points 45. The scraping blades 44 are normally positioned above the path of the section and supported in this position by having the bars 40 normally resting on the rollers 47 which are mounted on the standards 48 carried by the platform 5 and the bars 40 have cut-out portions 49 whereby it will be noted that as the platform 5 moves longitudinally toward one end of the machine the rollers 47 will move into the cut-out portion 49 and permit the bars 40 to drop downwardly to the position shown in Fig. 3, so that the scraping blades 44 will move into contact with the edges of the sections.

The bars 40 are normally forced downwardly by means of the spring plates 50, the inner ends of which engage the upper edges of the bars 40 at a point adjacent the guide members 38, the outer ends of said spring members being connected to the upper ends of the pivoted brackets 51 carried by the standards 46. The lower ends of these brackets carry adjusting screws 52 engaging the standards 46 whereby adjustment of the screws 52 will move the brackets 51 to a locked position on their pivots and increases the tension of the spring 50 or decreases the same.

A second set of scraping blades 44' are carried by the bars 40' arranged upon the lower sides of the platform 5 and mounted in the same manner as the bars 40. The bars 40' are arranged in the slots 39' of the guide member 38' and normally urged against the rollers 47' carried by the angular supporting brackets 53 which are attached to the platform 5 above the same. As best illustrated by Figs. 1 and 6, the scraping blades 44' are admitted to engage the lower edges of the comb section when the cutout portions 54' of platform 5 are opposite the cutout portions 54 of side plates 4. The bars 40' are normally urged into contact with the rollers 47' by means of a spring member 50' attached to the pivoted brackets 51' and adjusted in the same manner as the springs 50.

From the above it will be apparent that in the operation of my improved machine, a section is placed in position upon the movable platform 5 with the frame 31 and lever 12 in their inoperative position as shown in Figs. 1 and 2, and as the handle 14 of the lever is grasped by the operator and moved forwardly, the frame 31 will tend to swing toward the section in order to clamp the same against the arms 29. Upon continued movement of the platform 5, the rollers 47 and 47' will ride upon the edges of the bars 40 and 40' into the cut-away portions 49 and 49' to permit the bars to move toward each other in order to engage the scraping knives 44 and 44' with the edges of the section. At the same time the above movement is being carried out the rollers 7 are moving from engagement with the side plates 20 permitting the plates to move inwardly toward the sides of the sections so as to engage the scraping knives 24 with the sides of the sections, thus as the section is moved between the various sets of scraping knives the edges of the same as well as the two sides will be scraped of bee glue and other material. After the section has been scraped on one side, the platform 5 is returned to its normal position as shown at Fig. 1 and the section turned at right angles to the same so that the remaining sides and edges may be cleaned in the same manner.

In the construction of my device it will be noted that various parts thereof are so arranged that they may be readily removed and particular attention is directed to the detachable mounting of these side plates 20 wherein movement of the angle plate 18, the lugs 19 and 21 may be quickly removed from the openings in which they are mounted.

In Fig. 10 I have illustrated a slight modification of the device wherein the engaging members 33 on the frame 21 are provided with the spaced perforated ears and mounted upon these two are the rollers 31' which engage against one side of the section for retaining the same in position.

While I have shown and described the preferred form of my invention, it will be obvious that various changes in the details of construction and in the proportions may be resorted to for successfully carrying my invention into practice without sacrificing any of the novel features or departing from the scope of the appended claims.

Having thus described my invention what I claim is:

1. A device of the class described for scraping comb sections including a frame, a platform movable thereon, means for moving said platform, means for engaging and retaining a comb section on said platform, and scraping elements supported from said frame and operable by movement of said platform to engage with the positioned section.

2. A device of the class described for scraping comb sections including a frame, a platform movable thereon, a lever having pivotal connection with the frame for imparting movement to said platform, clamping means movable with the platform for securing thereto a comb section positioned thereon, supporting means, means for actuating said supporting means upon movement of the platform, and scraping elements positioned upon the supporting means for engaging the edges of said comb section relative to the movement of the platform.

3. A device of the character described for scraping comb sections including a platform, means supporting the platform for movement, means for moving said platform, spaced clamping members carried by the platform, clamping means supported for pivotal movement by the platform and movable therewith to clamp a comb section against the clamping members, operating means adapted for engagement with the pivotally supported clamping means upon movement of the platform, scraping elements, and means adapted to be actuated by movement of the platform for moving said scraping elements toward or away from the positioned section.

4. A device of the character described for scraping comb sections including a supporting frame, a platform movably carried thereby, means for moving the platform, clamping means for clamping a section member on the platform, means adapted for engagement with the clamping means upon movement of the frame in one direction, to move the clamping means into clamping relation with the section member and means to move the clamping means from clamping relation upon movement of the platform in the opposite direction, and a plurality of scraping elements mounted on said frame adapted for scraping engagement with the section member.

5. A machine of the character described for scraping comb sections including a stationary frame, a movable platform carried by the frame, means for moving said platform, clamping means adapted for clamping engagement with a section member on the platform, means for actuating said clamping means upon movement of the platform, pivotally mounted plates carried on the frame and arranged upon opposite sides of the platform, means operable by movement of the platform and operable on the plates to move the plates in a direction from each other, resilient members engaging the plates for returning the same to their normal position, means for limiting movement of said plates toward each other, and scraping elements carried by the plates.

6. A machine of the character described for scraping comb sections including a frame, spaced side plates attached thereto, a platform slidably positioned between said plates, scrapers adjustably positioned in said plates, and means for moving the scrapers toward and away from the platform relative to the frame.

7. A machine of the character described including a frame, a movable platform carried thereby, means for moving said platform, means for clamping a comb section on the platform, spaced scraping members mounted upon said frame and arranged above and below the platform, resilient elements engaging said scraping members for urging them into scraping engagement with the positioned comb section, and means for adjusting the tension of said resilient elements and means for controlling the operation of said resilient elements.

In testimony whereof I affix my signature.

JOHN O'BRIEN.